(12) United States Patent
Henry

(10) Patent No.: US 9,061,467 B2
(45) Date of Patent: Jun. 23, 2015

(54) PORTABLE HEAT WELDING MACHINE

(75) Inventor: Brian D. Henry, North Lawrence, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 797 days.

(21) Appl. No.: 13/278,314

(22) Filed: Oct. 21, 2011

(65) Prior Publication Data

US 2013/0098887 A1 Apr. 25, 2013

(51) Int. Cl.
| | |
|---|---|
| *B29C 65/18* | (2006.01) |
| *B32B 37/06* | (2006.01) |
| *B32B 39/00* | (2006.01) |
| *B32B 43/00* | (2006.01) |
| *B30B 3/04* | (2006.01) |
| *B30B 15/34* | (2006.01) |
| *B29C 65/20* | (2006.01) |
| *B29C 65/00* | (2006.01) |

(52) U.S. Cl.
CPC ........... *B29C 65/2084* (2013.01); *B29C 66/135* (2013.01); *B29C 66/431* (2013.01); *B29C 66/73921* (2013.01); *B29C 66/8324* (2013.01); *B29C 66/83413* (2013.01); *B29C 66/8362* (2013.01); *B29C 66/845* (2013.01); *B29C 66/86533* (2013.01); *B29C 66/8742* (2013.01); *B29C 66/876* (2013.01); *B29C 66/91421* (2013.01)

(58) Field of Classification Search
CPC .... B29C 65/02; B29C 65/18; B29C 65/2084; B29C 66/1122; B29C 66/135; B29C 66/431; B29C 66/73921; B29C 66/80; B29C 66/8324; B29C 66/83413; B29C 66/8362; B29C 66/845; B29C 66/86533; B29C 66/8742; B29C 66/876; B29C 66/91421; B32B 37/0053; B32B 2037/0061
USPC .................. 156/391, 538, 542, 555, 580, 582, 156/583.1, 583.9
See application file for complete search history.

(56) References Cited

U.S. PATENT DOCUMENTS

| | | | | |
|---|---|---|---|---|
| 3,747,446 | A * | 7/1973 | Davis | 82/53.1 |
| 4,872,941 | A * | 10/1989 | Lippman et al. | 156/497 |
| 5,459,916 | A * | 10/1995 | Jackel et al. | 29/407.08 |
| 2009/0320729 | A1* | 12/2009 | Henry et al. | 112/313 |

* cited by examiner

*Primary Examiner* — Sing P Chan
(74) *Attorney, Agent, or Firm* — Sand & Sebolt

(57) ABSTRACT

A relatively small and lightweight portable plastic welding machine is suitable for use on a table top. The welding machine has stationary and traveling modes for welding one or more sheets of flexible plastic material. A single motor is provided for driving rotation of pinch rollers adjacent a welding tip and rotation of a drive wheel to cause travel of the machine. A clutch provides the ability to easily switch between the stationary and traveling modes.

20 Claims, 10 Drawing Sheets

PORTABLE HEAT WELDING MACHINE

BACKGROUND OF THE INVENTION

1. Technical Field

The present invention is related generally to seaming machines. More particularly, the present invention is related to a heat welding machine used for heat welding a seam on one or more sheets of flexible material. Specifically, the present invention is related to a relatively small and portable heat welding machine which may be used on a table top or the like and which has stationary and traveling modes.

2. Background Information

There are a wide variety of heat welding machines known in the art, including those which are very large and very costly, as well as those which are fairly large and fairly costly as well. Even the smaller of these types of machines may take up sufficient space which is prohibitive for use in some environments. In addition, these smaller units tend to be stationary unless provided with a separate traveling carriage. The use of such an add-on carriage thus increases the weight, takes up additional space and is relatively inconvenient and time consuming to transform a stationary welding machine into a mobile or traveling machine. Thus, there is a need in the art for a smaller portable welding machine which may easily be used in a stationary or traveling mode whereby the machine is relatively low cost, takes up relatively little space and may be used on a table top or the like.

BRIEF SUMMARY OF THE INVENTION

The present invention provides a welding machine comprising a frame; a plurality of support surface-engaging wheels extending downwardly from the frame adapted for rolling on a support surface; the wheels comprising a drive wheel; a welding unit mounted on the frame; a set of first and second pinch rollers rotatably mounted on the frame; and a motor operatively connected to the drive wheel and pinch rollers for driving rotation of the drive wheel and pinch rollers.

The present invention also provides a welding machine comprising a frame; a welding unit mounted on the frame; a set of first and second pinch rollers rotatably mounted on the frame; a motor mounted on the frame; and a plurality of support surface-engaging wheels extending downwardly from the frame adapted for rolling the frame on a support surface; the wheels comprising a drive wheel having a driving mode in which the drive wheel rotates in response to operation of the motor and a non-driving mode in which the drive wheel does not rotate in response to operation of the motor.

The present invention further provides a method comprising the steps of rolling a welding machine on a support surface by rotating a drive wheel which rollingly engages the support surface; driving rotation of the drive wheel with a motor of the machine; pinching first and second layers of sheet material between a pair of pinch rollers of the machine; driving rotation of the pinch rollers with the motor; and heating the first and second layers with a welding unit of the machine to form a seam between the first and second layers.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
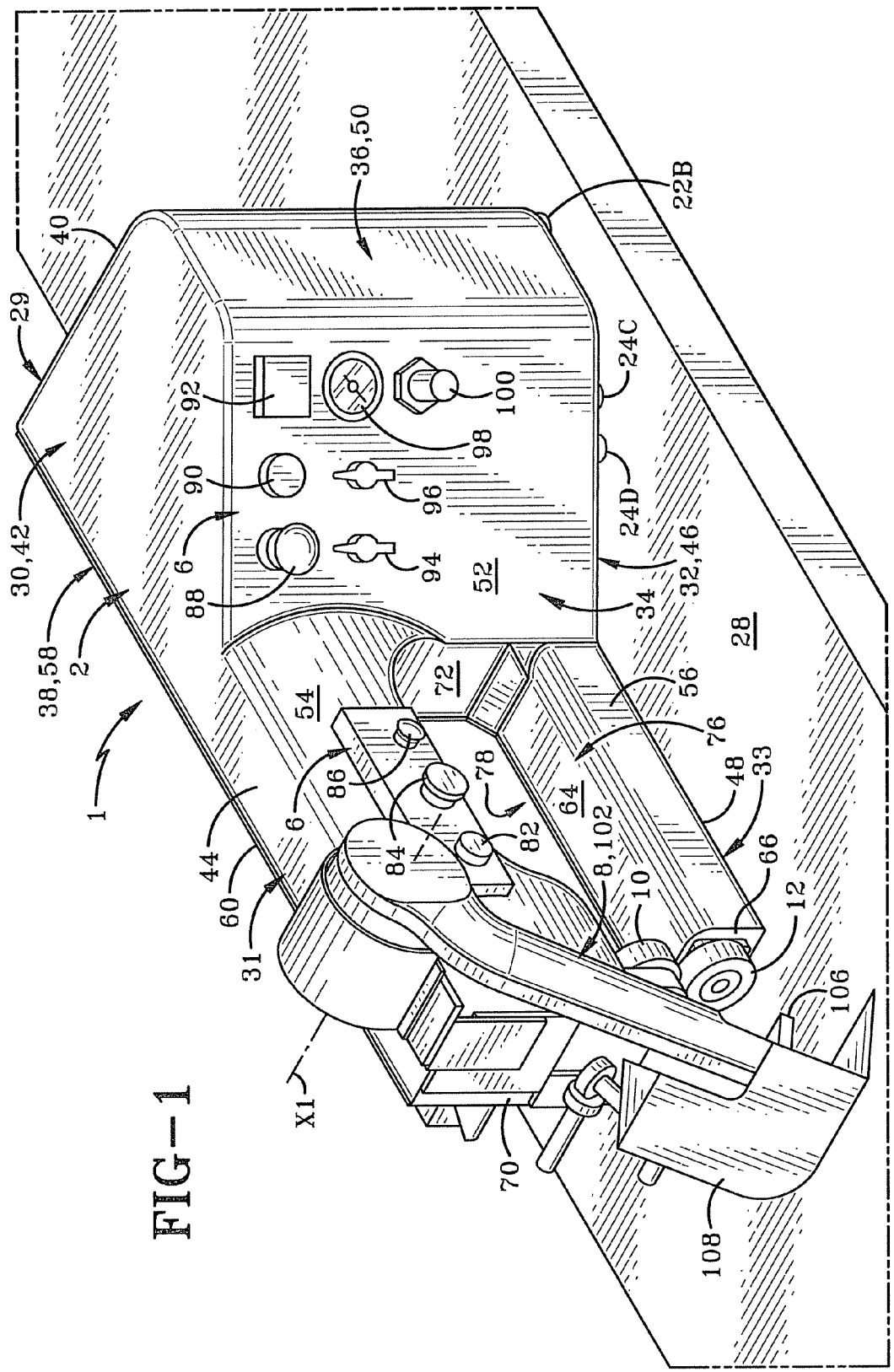
FIG. 1 is a perspective view of the plastic welding machine of the present invention shown seated on a table top or other support surface.

The plastic welding machine of the present invention is shown generally at 1 in FIG. 1. Machine 1 is typically configured as a generally smaller and lighter weight unit than other plastic welding machines which perform similar welding tasks. For instance, other such machines are typically in the range of about 700 pounds whereas machine 1 in the exemplary embodiment is on the order of about 105 to 110 pounds. Thus, machine 1 is generally a portable machine which may be carried by one or two persons without much difficulty. The size and configuration of machine 1 makes it highly suitable for use as a tabletop hot welding machine. In addition, machine 1 is configured to roll along a tabletop or other generally horizontal support surface as described in greater detail further below.

Figure 2:
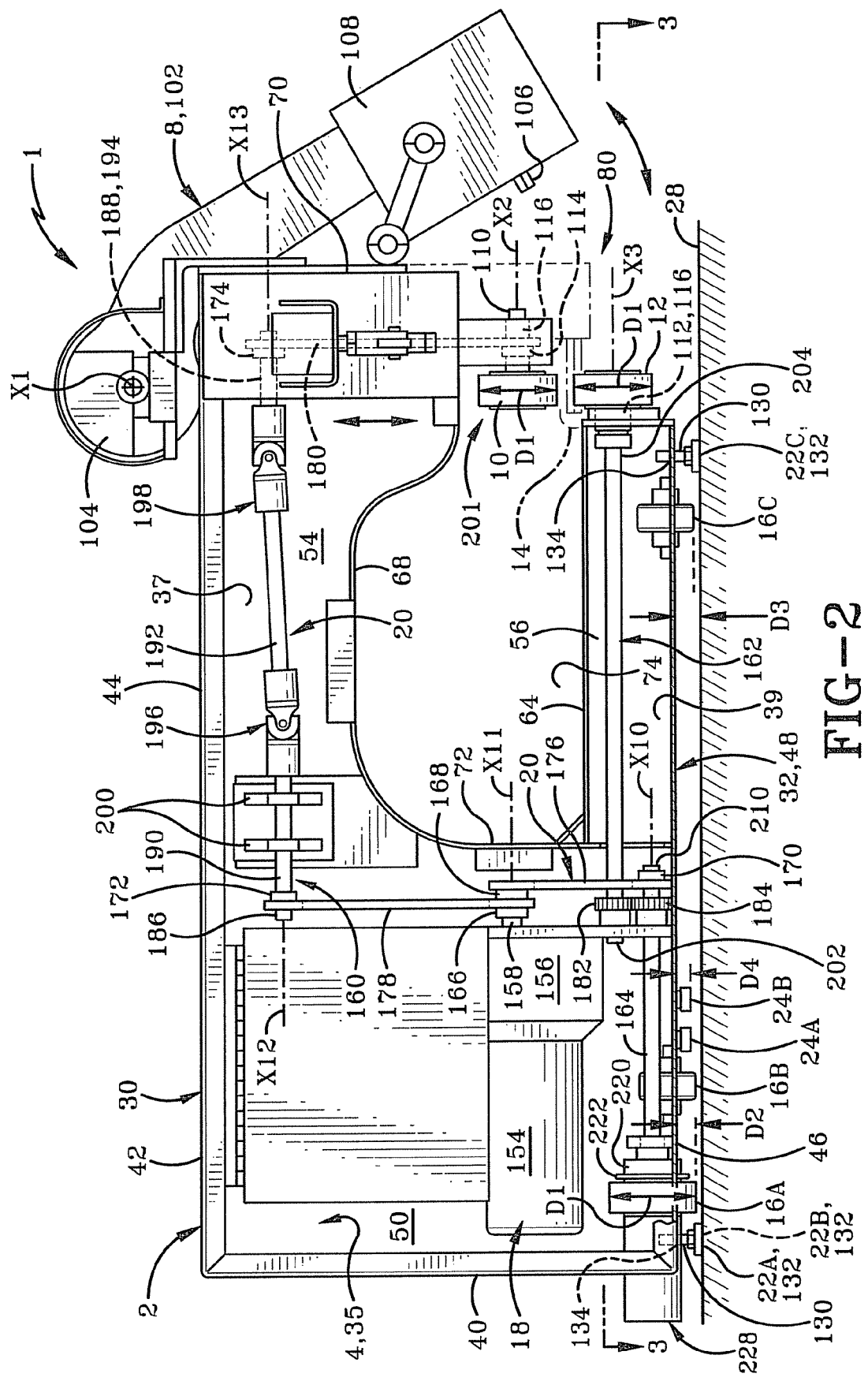
FIG. 2 is a rear elevational view showing the welding machine in the stationary mode with the feet in the lowered position and the wheels out of contact with the support surface, and with the back panel removed and most of the bottom panel in section to show the internal components of the machine.

Machine 1 includes a substantially rigid frame comprising a substantially rigid housing 2 which is typically formed of metal and defines an interior chamber 4 (FIG. 2). A manually accessible control panel 6 is mounted on the front of the housing. Machine 1 further includes a welding unit 8 which is pivotally movably mounted on the housing to pivot about substantially horizontal axis X1 which extends forward to rearward. Machine 1 also includes a pinch roller assembly mounted on the housing which includes a set of pinch rollers particularly including an upper pinch roller 10 and a lower pinch roller 12 which are rotatably mounted respectively about parallel horizontal axes X2 and X3 (FIG. 2) which extend from side to side and are substantially perpendicular to axis X1. Pinch rollers 10 and 12 are typically formed of an elastomeric material although they may also be formed of a metal such as stainless steel or other suitable materials. A sheet material guide 14 is mounted on the housing adjacent and upstream of the pinch rollers. Welding unit 8, rollers 10 and 12 and guide 14 are external to housing 2. A plurality of support engaging wheels are mounted on the housing and extend downwardly from the bottom thereof. In the exemplary embodiment, these wheels include three wheels 16A-C (FIG. 2-4) each of which is partially within interior chamber 4 and partially external thereto. Wheel 16A serves as a drive wheel which may be driven in order to drive the movement or travel of machine 1 along a support surface whereas wheels 16B and C are idler wheels.

With primary reference to FIG. 2, powered drive mechanism 18 is mounted on housing 2 entirely within interior chamber 4 and is configured for driving or powering the rotation of drive wheel 16A and pinch rollers 10 and 12. A drive train 20 is also mounted on housing 2 and is entirely or nearly entirely within interior chamber 4. Drive train 20 extends between drive mechanism 18 and each of drive wheel 16A, pinch roller 10 and pinch roller 12 and is configured for transmitting the output motion of drive mechanism 18 into rotational movement of wheel 16A and pinch rollers 10 and 12. Typically, drive mechanism 18 provides a rotational output which drive train 20 transmits to the drive wheel and pinch rollers. Thus, the drive wheel 16A and pinch rollers 10 and 12 are typically rotationally coupled to drive mechanism 18 via drive train 20.

A plurality of support engaging feet 22 (FIGS. 2, 4) are mounted on and extend downwardly from the bottom of housing 2. In the exemplary embodiment, there are three of these feet 22A-C. A plurality of guide rollers 24 (FIGS. 1-4) are also rotatably mounted on housing 2 and extend downwardly from the bottom of the housing external thereto. More particularly, these rollers include guide rollers 24A-D which are respectively rotatably mounted about parallel vertical axes X4, X5, X6 and X7, which are thus perpendicular to axes X1-X3. The circular outer circumferences of rollers 24 are configured to rollingly engage a straight rigid guide 26 which is securely mounted atop a table top or other generally horizontal support surface 28.

Referring to FIGS. 1-4, housing 2 includes a main or primary section 29, a top arm 31 which is rigidly secured to and extends outwardly from main section 29 in a cantilever fashion, and a bottom arm 33 which is directly below top arm 31 and is likewise rigidly secured at one end thereof to main section 29 and extends outwardly therefrom in a cantilever fashion in the same direction as top arm 31. Housing 29 includes several panels each of which is typically formed from sheet metal. More particularly, housing 2 includes a substantially horizontal top panel 30, a substantially horizontal bottom panel 32 having substantially the same shape as and positioned directly below top panel 30 and a side wall 34 which extends between and is secured to top and bottom panels 30 and 32. Side wall 34 more particularly is also typically formed of sheet metal and is secured along its top edge along the entire outer perimeter of top panel 30 and along its bottom edge along the entire outer perimeter of bottom panel 32. Side wall 34 includes a front panel 36, a back panel 38 and a right side panel 40. Top panel 30 includes a top panel main section 42 and a top panel top arm section 44 which is substantially narrower from front to back than main section 42. Bottom panel 32 similarly includes a bottom panel main section 46 having substantially the same shape as main section 42, and a bottom panel bottom arm section 48 which is also substantially narrower from front to back than main section 46 and is disposed directly below top arm section 44. Bottom arm 33 is somewhat shorter than top arm 31 such that section 48 is likewise somewhat shorter than section 44.

Front panel 36 includes a front panel front most section 50 which is secured to the front of side panel 40 and extends laterally therefrom to the left. Front panel 36 further includes an angled section which is secured to and extends rearwardly and to the left from the left side or edge of section 50. Front panel 36 further includes a front panel top arm section 54 which is secured to the upper left side of angled section 52 and extends to the left therefrom generally parallel to section 50. Panel 36 further includes a front panel bottom arm section 56 secured to the lower left portion of angled section 52 and extends laterally to the left therefrom substantially parallel to section 50 and section 54. Back panel 38 includes a back panel main section 58 which is generally square or rectangular, a back panel top arm section 60 and a back panel bottom arm section 62 which respectively are secured to and extend in a cantilever manner from the upper left and lower left ends or edges of main section 58 laterally therefrom to the left.

Bottom arm 33 includes a bottom arm top panel 64 which is substantially horizontal and rectangular and which is secured at its front edge to the top edge of section 56 and at its rear edge to the top edge of section 62. Side wall 34 further includes a bottom arm side panel 66 which serves as a free end of bottom arm 33 and which is secured to the left edges of the front, back, top and bottom panels of bottom arm 33. Top arm 31 further includes a top arm bottom panel 68 which is directly above and spaced upwardly from top panel 64. Panel 68 is secured at its front edge to the bottom edge of section 54 and at its back edge to the bottom edge of panel 60. Side wall 34 further includes a top arm side panel 70 of top arm 31 which serves as an upper free end of top arm 31 which is higher than the lower free end 66 of bottom arm 33 and spaced laterally outwardly to the left further from main section 29 than is free end 66. Main section 29 further includes a main section left side panel 72 which defines the left side of the main section, is substantially vertical and extends between the right edges of panels 64 and 68, and between front and back panels 36 and 38 adjacent the connections between main section 29 and arms 31 and 33.

With primary reference to FIG. 2, interior chamber 4 includes a primary or main portion 35 defined by the various panels making up main section 29 of housing 2, a top arm portion 37 defined by the various panels making up top arm 31, and a bottom arm portion 39 defined by the various panels making up bottom arm 33. The right end of top arm portion 37 thus communicates with the top rear left side of main portion 35. The right end of bottom arm portion 39 communicates with the bottom rear left side of main portion 35. Each of portions 37 and 39 have a length as measured from left to right which is similar to the left to right dimension of main section 35. However, each of portions 37 to 39 has a height which is substantially less than the height of portion 35 and a width as measured from front to back which is substantially less than the corresponding width of main portion 35.

Top and bottom arms 31 and 33 define therebetween a sheet material receiving space 74 (FIG. 1) having a front entrance opening 76, a rear entrance opening 78 and a lateral left side entrance opening 80 (FIG. 2). More particularly, space 74 is defined by panels 64, 68 and 72. Thus, space 74 extends from the front to the back of arms 31 and 33 and laterally to the left from panel 72 or the left side of main section 29 generally to free ends 66 and 68.

Referring to FIG. 1, control panel 6 includes several switches, controls or gauges. In particular, the control section or panel includes a travel or go switch 82, a travel off, pause or stop switch 84, a pinch roller open/close switch 86, an emergency stop switch 88, a reset switch 90, a temperature control 92, a travel speed control 94, a pinch roller drive delay or rotation delay control 96, a pinch roller pressure gauge 98 and a pressure regulator or control 100.

Figure 7:
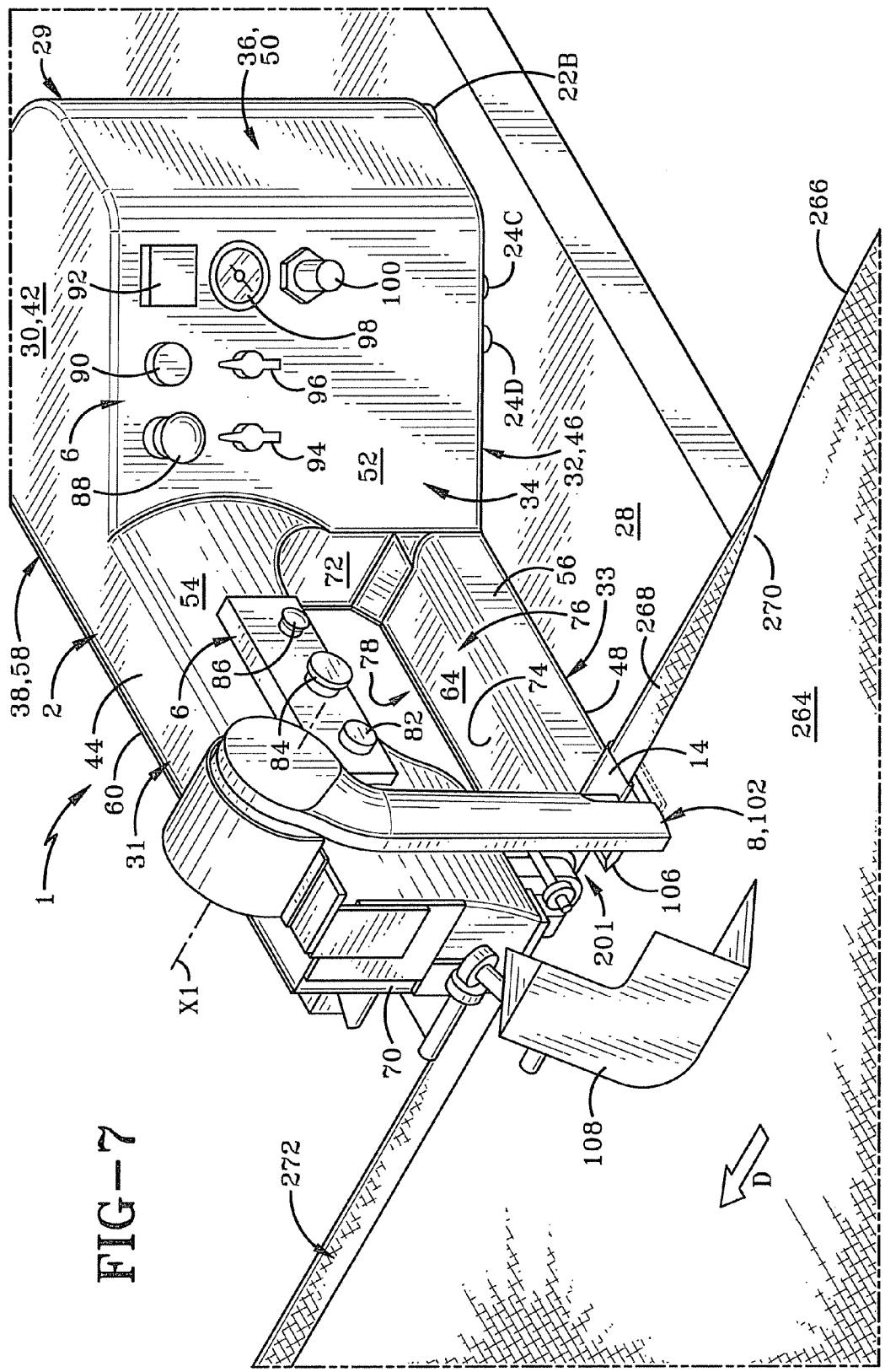
FIG. 7 is similar to FIG. 1 and shows the welding machine in the stationary mode welding a sheet of material.
Figure 8:
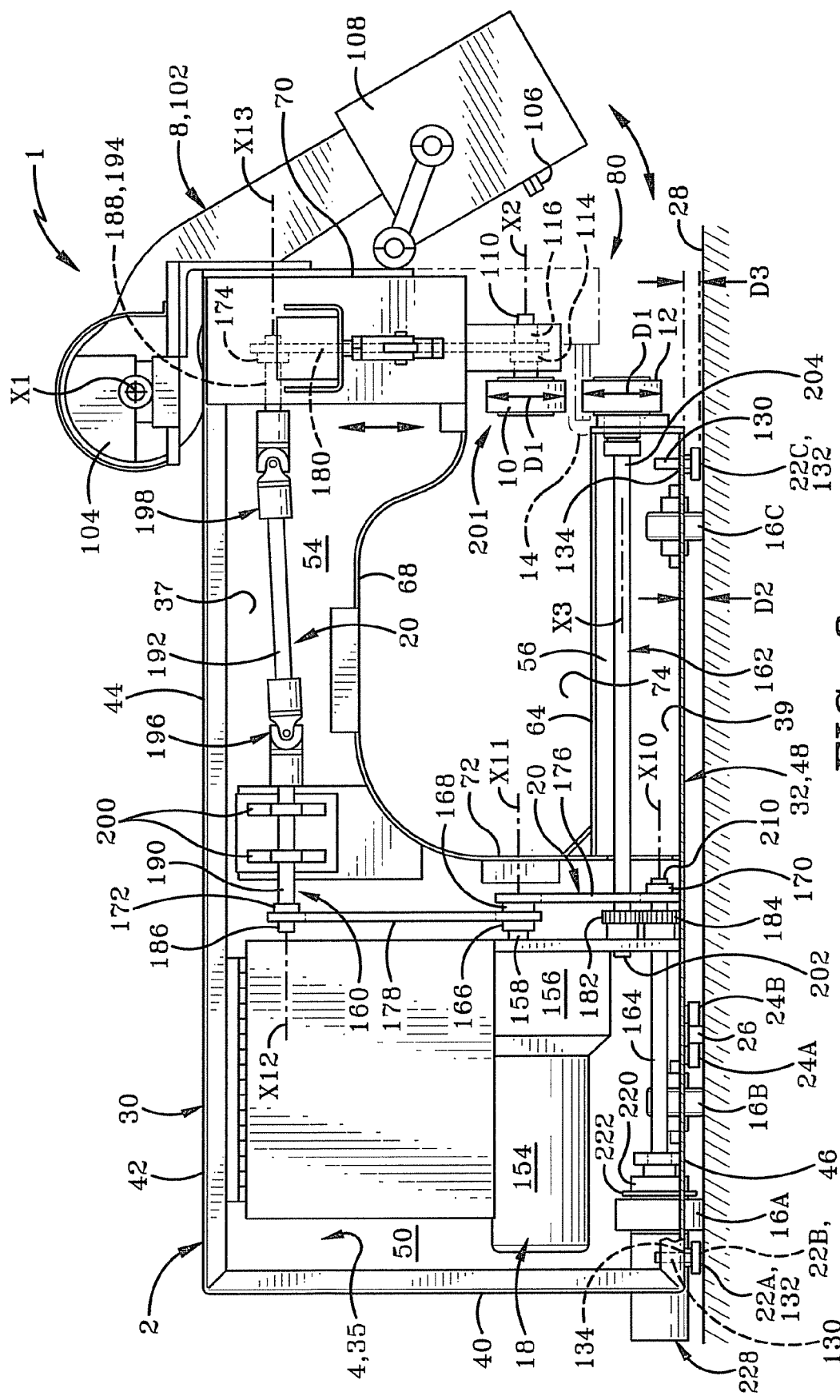
FIG. 8 is similar to FIG. 2 and shows the welding machine in the traveling mode with the feet in the raised position and the wheels contacting the support surface.

Referring to FIGS. 1-2, welding unit 8 includes a rigid pivot arm 102 having an upper end which is mounted adjacent axis X1 and extends downwardly therefrom to a lower end. A pneumatic or other suitable pivot arm drive mechanism or motor 104 is mounted on housing 2 adjacent the free end 70 of top arm 31 and extends forward therefrom whereby pivot arm 102 is also spaced forward of and adjacent top and bottom arms 31 and 33. A welding tip 106 is mounted on pivot arm 102 adjacent its lower end. A safety guard 108 is mounted on and extends outwardly from free end 70 of top arm 31 such that guard 108 is spaced laterally outwardly from free end 70 to the left thereof. Drive mechanism 104 is configured to drive the pivotal movement of pivot arm 8 to move welding tip 106 between a welding position (FIGS. 7, 10) adjacent and directly upstream of pinch rollers 10 and 12 and a non-welding position (FIGS. 1, 2, 8) laterally outwardly beyond free end 70 away from the pinch rollers and adjacent safety guard 108. More particularly, when welding tip 106 is in the non-welding position, various walls of safety guard 108 are adjacent and directly rearward or downstream of tip 108, directly below tip 106 and directly to the left side of tip 106 such that tip 106 is generally between housing 2 and the left side wall of guard 108.

Referring to FIG. 2, the pinch roller assembly further includes axles 110 and 112. Roller 10 is mounted on and extends radially outwardly from axle 110. Likewise, roller 12 is mounted on and extends radially outwardly from axle 112, which is parallel to axle 110. Axles 110 and 112 respectively define the central axes X2 and X3. A sprocket 114 is rigidly secured to and extends radially outwardly from axle 110 within a downward extension from top arm 31 adjacent free end 70. Each of axles 110 and 112 are rotatably mounted via respective roller bearings 116. In the exemplary embodiment, the circular outer surfaces of rollers 10 and 12 each define an outer diameter D1, as does the circular outer surface of drive wheel 16A, whereby each of rollers 10 and 12 and wheel 16A have outer diameters which are substantially identical.

Figure 3:
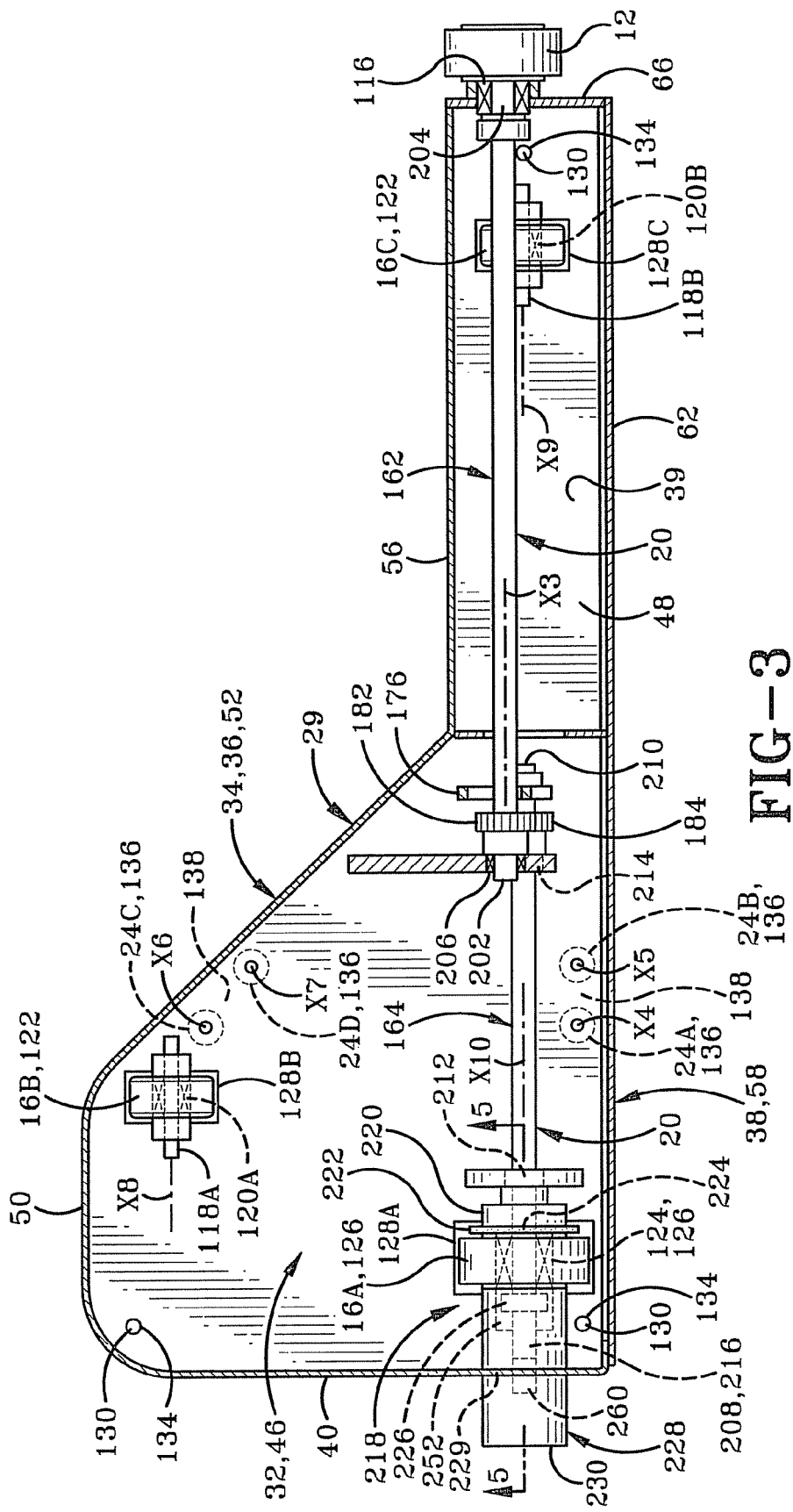
FIG. 3 is a sectional view taken on line 3-3 of FIG. 2.

With primary reference to FIG. 3, idler wheels 16B and C are rotatably mounted on respective axles 118A and 118B via respective roller bearings 120A and B. Each of wheels 16B and 16C has a circular outer perimeter or surface 122. Drive wheel 16A is also mounted by a roller bearing 124 that has a circular outer perimeter or surface 126. The majority of each of wheels 16 is within interior chamber 4 while portions of the lower halves of wheels 16A-C respectively extend downwardly below the bottom of bottom panel 32 through wheel openings or holes 128A-C formed in bottom panel 32. In the exemplary embodiment, axle 118A is secured to main section 46 of bottom panel 32 within main portion 35 of chamber 4. The wheel assembly including axle 118A, bearing 120A and wheel 16B, as well as hole 128B are generally adjacent the front of main section 29 and more particularly adjacent the intersection of sections 50 and 52 of front panel 36. Axle 118B is secured to bottom arm section 48 of bottom panel 32 within bottom arm portion 39 of chamber 4. More particularly, the wheel assembly including axle 118B, bearing 120B and wheel 16C as well as hole 128C are spaced inwardly from and adjacent the free end or end panel 66 of bottom arm 33 and thus also generally adjacent pinch roller 12. Drive wheel 16A, bearing 124 and hole 128A are adjacent the back and right side of main section 29 of housing 2 and thus adjacent the intersection between right side panel 40 and main section 58 of back panel 38. Hole 128A extends to the right beyond the right side of drive wheel 16A to the right side of bottom panel main section 46.

With continued reference to FIG. 3, idler wheels 16B and 16C rotate respectively about parallel horizontal axes X8 and X9 which are parallel to and lower than axis X3. Axes X3 and X9 are generally adjacent one another and pass through bottom arm portion 39 of chamber 4. Axis X8 and its wheel assembly are thus spaced forward of axis X9 and its wheel assembly. Axis X8 and its wheel assembly are also spaced forward of arms 31 and 33 and pinch rollers 10 and 12. Drive wheel 16A is rotatable about a horizontal axis X10 which extends laterally from left to right and is parallel to axes X3, X8 and X9. Axis X10 is at approximately the same height as axis X9, is generally adjacent axis X9 and may be coaxial therewith. Axis X10 is offset downwardly of and adjacent axis X3. Axis X10 is also about the same height as axis X8 and spaced rearwardly thereof. Each of axes X3, X9 and X10 pass through bottom arm portion 39 and the rear of main portion 35 of chamber 4. Wheels 16 are typically formed primarily of an elastomeric material. In the exemplary embodiment, the bottom of the circular outer perimeters of wheels 16A-C is spaced downwardly from the bottom of the housing, which is typically defined by the bottom of bottom panel 32. More particularly, the bottom of housing 2 and the bottom of each of wheels 16 define therebetween a vertical distance D2 (FIG. 2).

Figure 4:
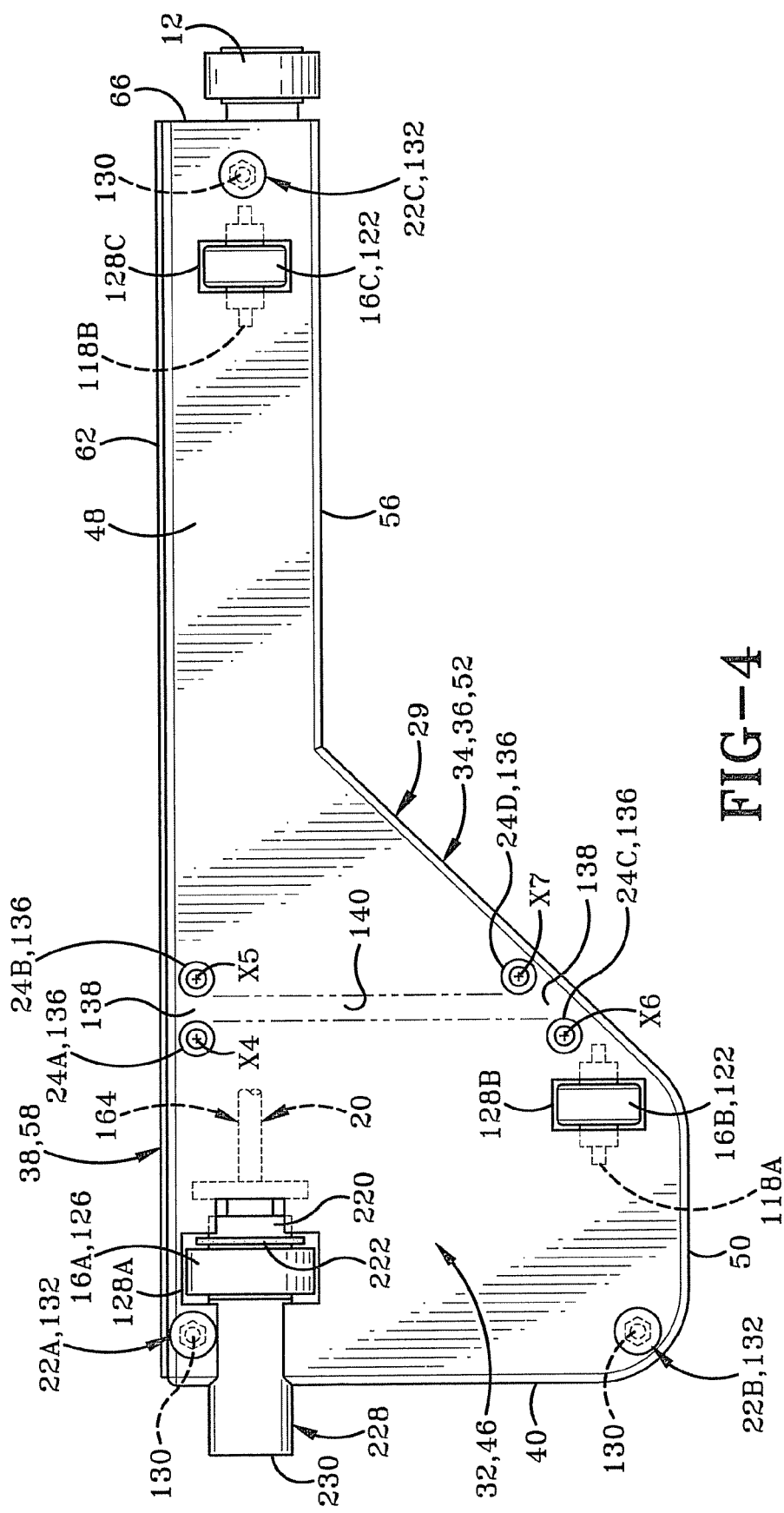
FIG. 4 is a bottom plan view of welding machine.

With primary reference to FIGS. 2-4, each foot 22 is vertically adjustable and typically includes an externally threaded rod 130 and a pad 132 which defines the bottom of the foot. Pad 132 is typically formed of an elastomeric material to provide a gripping surface and anti-vibration properties although other materials may be used. Each threaded rod 130 threadedly engages a threaded hole 134 formed along bottom panel 32. Foot 22A and its associated threaded hole 134 are adjacent wheel 16A and the right rear of housing 2 and thus adjacent the right rear portion of main section 46 adjacent the intersection between back panel 38 and side panel 40. Foot 22B and its associated hole 134 are adjacent the front right of the housing and main section 46 adjacent the intersection between side panel 40 and section 50 of front panel 36. Foot 22C and its associated hole 134 are adjacent the left rear of the housing, the left free end 66 of bottom arm 33, wheel 16C and pinch roller 12. The bottom of the housing and the bottom of each foot 122 define therebetween a vertical distance D3 (FIG. 2) which is adjustable. More particularly, the threaded rod 130 of each foot may be screwed upwardly or downwardly within hole 134 in order to raise and lower the given foot to adjust distance D3. Each foot 122 may thus be moved by rotation of the threaded rod to a lowered position in which distance D3 is greater than distance D2 and a raised position in which distance D3 is less than distance D2, which is a fixed distance in the exemplary embodiment.

With primary reference to FIG. 4, each of guide rollers 24 is typically rotatably mounted on the housing a roller bearing. Each roller has a circular outer perimeter or surface 136 which rollingly engages guide 26 during the rolling movement of machine 1 on wheels 16 in a direction parallel to guide 26. Rollers 24A and 24B serve as a rear set of guide rollers which are adjacent and spaced from one another to define therebetween a guide receiving space 138. Similarly, guide rollers 24C and D form a set of front guide rollers which likewise are adjacent and spaced from one another to define therebetween a similar guide receiving space 138. A guide pathway 140 is defined between two imaginary straight lines wherein one of the straight lines is drawn from the left of the outer perimeter 136 of roller 24A to the left of the outer perimeter 136 of 24C, and the other line is drawn from the right of outer perimeter 136 of roller 24B to the right of outer perimeter 136 of roller 24D. The normal width of pathway 140 measured between the imaginary lines is slightly greater than the width of guide 26. This straight pathway 140 is thus configured to receive therein the straight guide 26. The bottom of the housing and the bottom of each roller 24 defines therebetween a typically fixed vertical distance D4 which is less than distance D2 whereby rollers 24 do not contact the support surface 28 when the bottoms of wheels 16 are seated on or engage surface 28. Thus, wheels 16 extend downwardly further from the bottom of housing 2 than do rollers 24.

Figure 9:
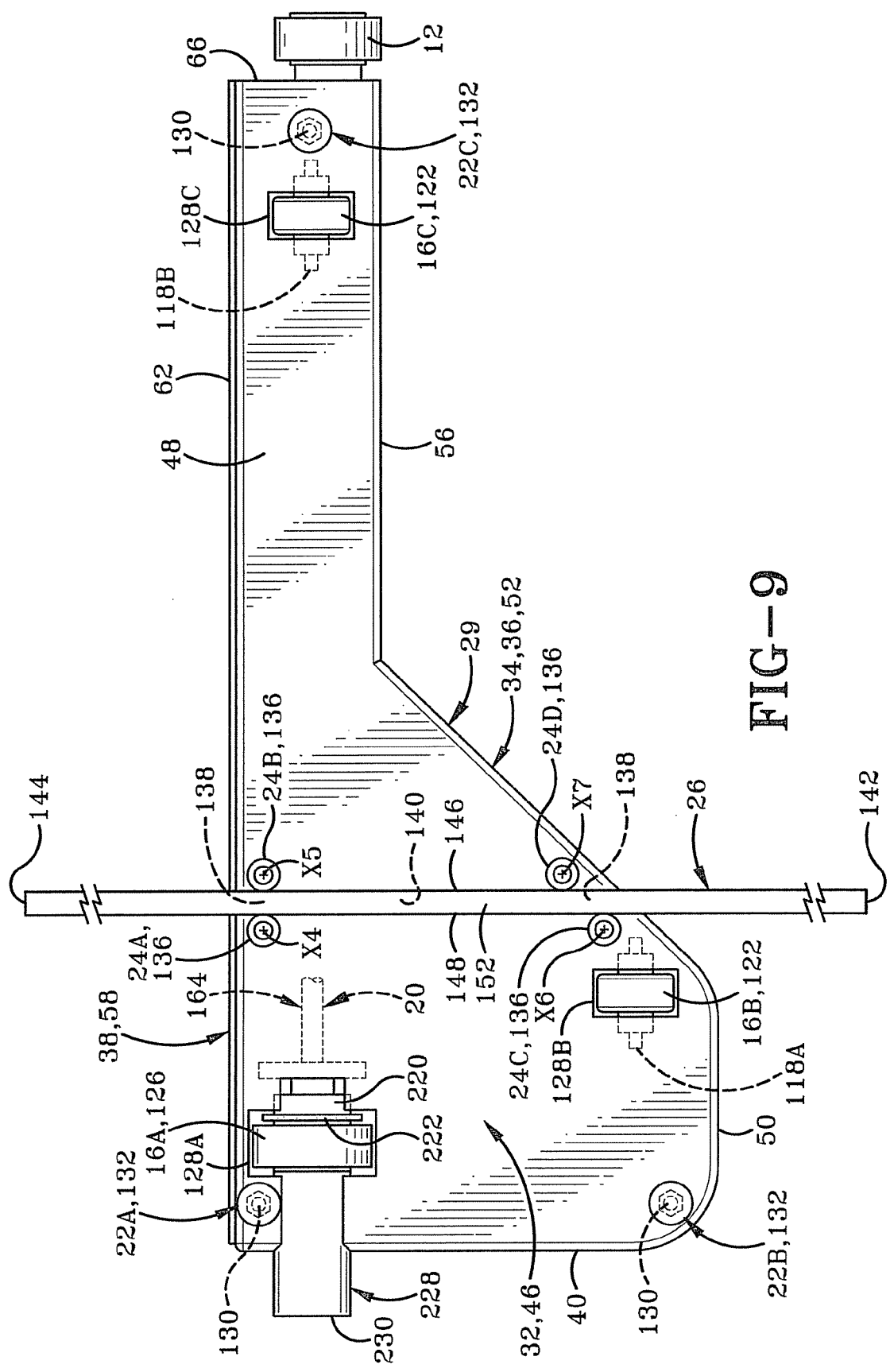
FIG. 9 is similar to FIG. 4 and shows the welding machine in the traveling mode with the guide rollers rollingly engaging the guide.
Figure 10:
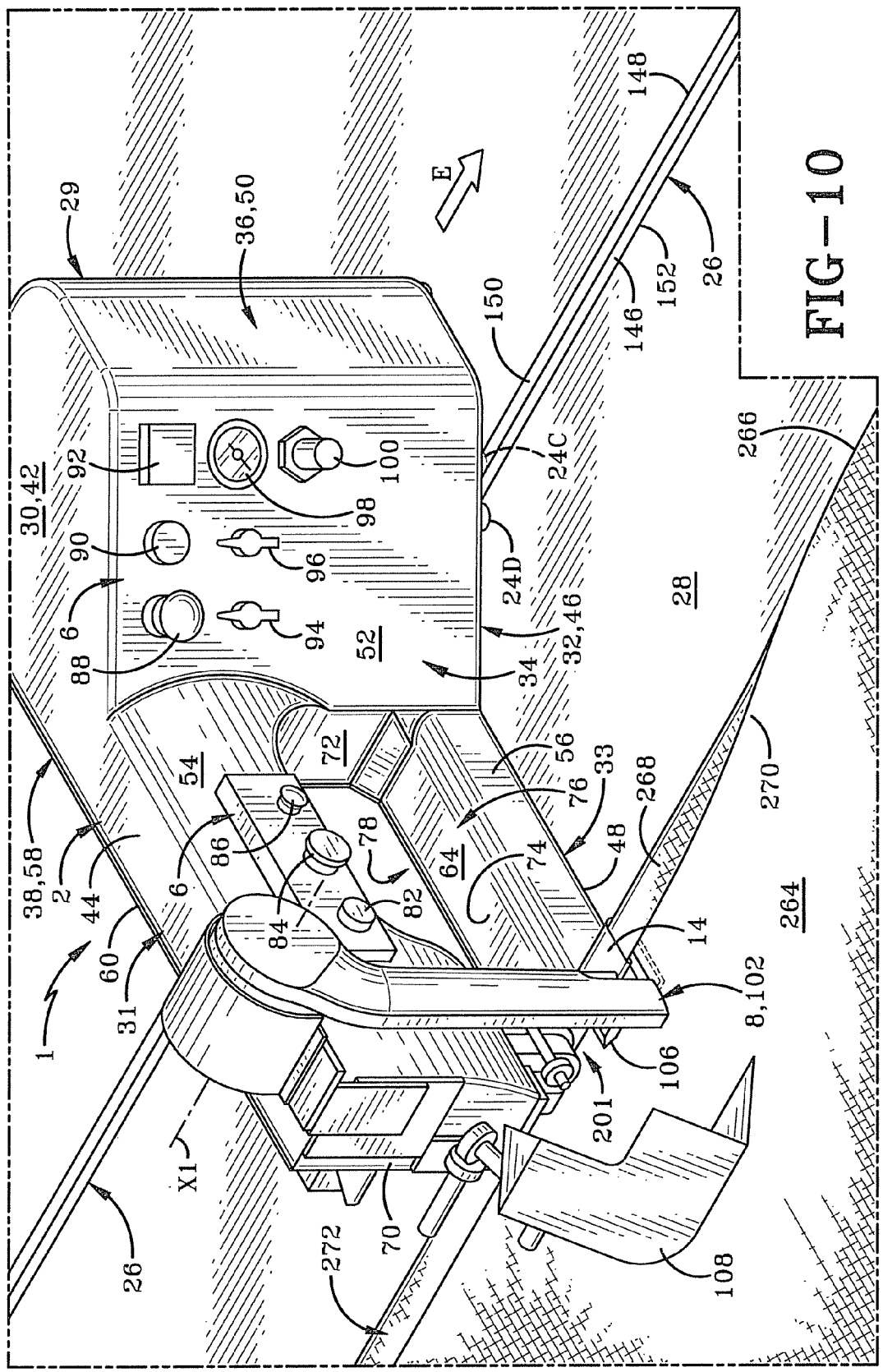
FIG. 10 is similar to FIG. 7 and shows the welding machine in the traveling mode welding a sheet of material.

With primary reference to FIGS. 9-10, guide 26 is typically in the form of an elongated straight rod, such as a rod having a square or rectangular cross-section although other shapes may be used as well. Guide 26 has front and rear ends 142 and 144 between which it is straight and elongated. Guide 26 has a left side 146, a right side 148, a top 150 and a bottom 152. Top and bottom 150 and 152 define therebetween a height which is less than distance D2 so that top 150 does not contact the bottom of the housing. The right sides of the left rollers 24B and 24D are configured to rollingly engage left side 146 while the left sides of the right rollers 24A and 24C are configured to rollingly engage the right side 148 of guide 26 when guide 26 is received within the spaces 138 and pathway 140. Guide 26 is typically secured to support surface 28 with its bottom 150 in contact therewith by screws or other suitable fasteners so that guide 26 is fixed relative to surface 28.

Referring to FIG. 2, drive mechanism 18 includes an electric motor 154 and typically a gear reduction box 156 which is driven by a rotational output of motor 154. Gear reduction box 156 includes a rotational output or drive shaft 158 which is rotatable about a horizontal axis X11 which is parallel to and higher than axes X3, X9 and X10. Gear box 156 thus serves to reduce the rotational rate of drive shaft 158 compared to the rotational rate of the drive shaft of motor 154.

With continued reference to FIG. 2, drive train 20 includes an upper pinch roller drive assembly which includes an upper pinch roller drive shaft 160; a lower pinch roller drive assembly which includes a rigid lower pinch roller drive shaft 162; and a drive wheel drive assembly which includes a rigid drive wheel drive shaft 164. Drive train 20 further includes several sprockets, including sprockets 166 and 168 which are both rigidly secured to and rotatable with drive shaft 158, a sprocket 170 which is rigidly secured to and rotatable with drive shaft 164, sprockets 172 and 174 which are rigidly secured to upper drive shaft 160 adjacent opposed ends thereof and rotatable therewith, and previously mentioned sprocket 114. Drive train 20 further includes flexible closed drive loops typically in the form of drive chains 176, 178 and 180. Chain 176 engages and revolves around sprockets 168 and 170, chain 178 engages and revolves around sprockets 166 and 172, and chain 180 engages and revolves around sprockets 174 and 114. While sprockets and chains are generally preferred, the above-noted sprockets may be sheaves and the above-noted chains may be closed loop drive belts. Drive train 20 further includes a gear 182 which is rigidly secured to and rotates with drive shaft 162, and another gear 184 which is rigidly secured to and rotates with drive shaft 164. Gear 184 meshes with gear 182 whereby the two gears rotate in opposite directions, as do shafts 162 and 164.

Upper shaft 160 has a first or right end 186 and an opposed second or left end 188. End 186 of shaft 160 and sprocket 172 are within the upper left rear of portion 35 adjacent the intersection of chambers 35 and 37 and the intersection between main section 29 and top arm 31. End 188 and sprocket 174 are within portion 37 adjacent free end 70 and top arm section 44 of top panel 30. Shaft 160 includes a rigid first or right segment 190, a rigid second or middle segment 192, and a rigid third or left segment 194. First and second segments 190 and 192 are connected by a first universal joint 196, and second and third segments 192 and 194 are also connected by a second universal joint 198. First segment 190 rotates about a substantially horizontal axis X12 which is substantially higher than and parallel to axes X3 and X10. Third segment 194 also rotates about a substantially horizontal axis X13 which is also substantially higher than and parallel to axes X3 and X10. Shaft 160 is rotatably mounted on the housing such as by two sets of roller bearings 200 along first segment 190. Sprockets 172 and 174 are respectively secured to and rotate with shaft 160 adjacent ends 186 and 188. More particularly, sprocket 172 is secured to first segment 190 and sprocket 174 is secured to segment 194.

Sprockets 174 and 114, chain 180, axle 110, upper pinch roller 10 and the associated bearing 116 are all part of an upper pinch roller assembly 201 which is vertically movable by a typically pneumatic actuator (not shown) between a raised non-pinching position in which rollers 10 and 12 are out of contact with one another and a lowered pinching position in which roller 10 and 12 are in contact with one another. The use of the three-segment drive shaft 160 and universal joints 196 and 198 allows for the vertical movement of assembly 201 and for the ability to maintain the rotational drive of pinch roller 10. Segment 194 thus moves up and down along with assembly 201, as does the left end of segment 192, which is facilitated by the pivoting action of joints 196 and 198. First segment 190 remains stationary or fixed relative to housing 2 other than its rotational movement.

Lower drive shaft 162 has a first or right end 202 and an opposed second or left end 204 and is rotatably mounted via roller bearing 116 adjacent end 204 and another roller bearing 206 adjacent end 202. Typically, at least a majority and often at least 70, 80 or 90 percent of shaft 162 is within the bottom arm or bottom arm portion 39 with end 204 adjacent free end 66. A remaining portion of shaft 162 extends into the main section or main portion 35 of the interior chamber so that end 202 is within portion 35 adjacent the bottom left rear thereof and adjacent the intersection of chambers 35 and 39 or the intersection between the main section 29 and bottom arm 33, as are gears 182 and 184, sprocket 170 and the left end of shaft 164. End 202 of shaft 162 is directly below or nearly directly below end 186 of shaft 160. End 204 of shaft 162 is roughly directly below end 188 of shaft 160 although end 188 laterally overhangs end 204 to the left a relatively short distance. This overhang allows sprockets 114, 174 and chain 180 to be spaced to the left of end 204 such that upper pinch roller 10 extends to the right from adjacent sprocket 114 directly above pinch roller 12.

Drive wheel drive shaft 164 has a first or right end 208, a second or left opposed end 210 and is rotatably mounted on the housing via roller bearings 212 and 214. Shaft 164 is entirely within main portion 35 of the interior chamber with end 208 adjacent the bottom right rear of portion 35, main section 29 and housing 2. Sprocket 170 and gear 184 are secured to shaft 164 adjacent end 210, which is generally adjacent and below end 202 of shaft 162. Shaft 164 includes an externally threaded end portion 216 adjacent end 208 and distal end 204 of shaft 164, pinch rollers 10 and 12 and tip 106.

Figure 5:
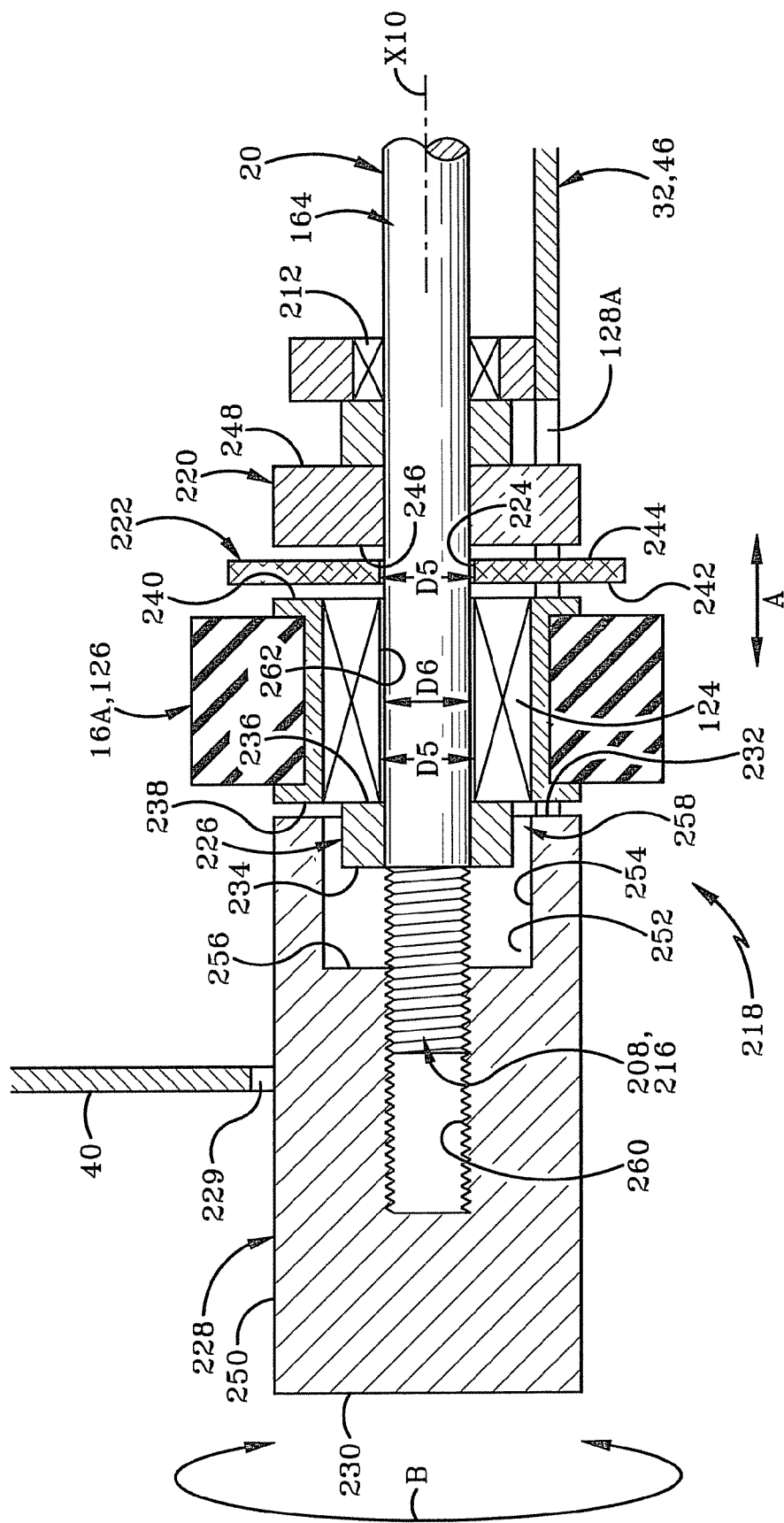
FIG. 5 is an enlarged sectional view taken on line 5-5 of FIG. 3 showing the clutch in the disengaged position.

With reference to FIGS. 2 and 5, drive train 20 includes a clutch 218 which is adjacent end 208 and drive wheel 16A and which has an engaged position and a disengaged position. In the engaged position, drive mechanism 18 is rotationally and drivingly engaged or coupled with drive wheel 16A in order to drive rotation thereof so that wheel 16A is in a driving mode and machine 1 is in a traveling mode for driving its travel along the support surface 28. In the disengaged position, drive mechanism 18 is rotationally and drivingly disengaged from wheel 16A such that drive wheel 16A is in a non-driving mode, machine 1 is in a non-traveling or stationary mode and drive mechanism 18 and the drive train will not drive rotation of drive wheel 16A when system 1 is in an upright position with wheel 16A contacting support surface 28. Thus, in the disengaged position, drive train 20 is not capable of transmitting sufficient torque from drive mechanism 18 to drive wheel 16A in order to cause the travel of system 1 via driving rotation of drive wheel 16A.

With primary reference to FIG. 5, clutch 218 includes a rigid hub 220 which is rigidly secured to and extends radially outwardly from drive shaft 164, a friction disc 222 having a central hole 224 which receives shaft 164 therethrough, a retaining member in the form of a clamp collar 226 and a handle 228, which serves as a clutch engagement and disengagement member or clutch control member. Handle 228 has a flat circular first or outer end or side 230 and an opposed annular circular second or inner end or side 232. Clamp collar 226 has first and second opposed circular annular sides 234 and 236; wheel 16A has first and second annular circular opposed sides 238 and 240; disc 222 has first and second opposed annular circular sides 242 and 244; and hub 220 has first and second opposed annular circular sides 246 and 248.

With continued reference to FIG. 5, handle 228 has a cylindrical outer surface 250 which extends from first end 230 to second end 232 and which serves as an externally accessible manual gripping surface which the user of system 1 may grip outside housing 2 with thumb and fingers to rotate (arrow B) handle 228 about axis X10. A cylindrical recess 252 is formed in handle 228 which extends inwardly from end 232 towards end 230 and which is defined by a cylindrical inner surface 254 which extends inwardly from end 232 toward end 230 to a circular annular inner end or intermediate surface or step 256. Recess 252 has a circular entrance opening 258 at end 232. A threaded hole 260 is formed in handle 262 which extends inwardly from surface or step 256 toward end 230. Threaded hole 260 threadedly engages threaded portion 216 of shaft 164 whereby rotation of handle 228 causes handle 228 to be threaded onto or unthreaded from the threaded portion of the shaft. A substantially circular hole 229 having a diameter slightly larger than that of the cylindrical outer surface 250 is formed in panel 40 adjacent the lower rear portion thereof and the lower rear right of main section 29 and main portion 35. The bottom of hole 229 intersects or communicates with the right side of hole 128A. Hole 229, which is aligned with the clutch components and shaft 164, receives therein handle 228 when handle 228 is threaded onto threaded portion 216. Handle 228 has a portion within chamber 35 and a portion outside chamber 35 adjacent hole 229 whereby handle 28 extends from inside the housing to outside the housing through hole 229 beyond vertical right side panel 40. The portion of handle 228 to the right of and outside the housing provides the externally accessible manual gripping surface of outer surface 250. In the exemplary embodiment, a lower portion of handle 228 adjacent the bottom thereof also extends downwardly into and through hole 128A, as do lower portions of hub 220 and disc 222.

Recess 252 (FIG. 5) has a larger diameter than hole 260 and receives therein clamp collar 226 such that collar 226 is not in contact with surfaces 254 and 256 or any portion of handle 228 when end 232 of handle 228 engages first end 238 of wheel 16A. Bearing 124 defines a central through hole 262 extending from first side 238 to second side 240. Hole 262 and hole 224 in disc 222 both have a diameter D5 which is a little larger than an outer diameter D6 of shaft 164 whereby drive wheel 16A and friction disc 222 are slidable along and parallel to shaft 164 back and forth as indicated by arrow A when handle 228 is unthreaded or loosened sufficiently to the degree that side 232 is disengaged from or out of contact with side 238 of wheel 16A. The rotation of handle 228 about axis X10 to respectively thread or tighten handle 228 and unthread or loosen 228 is shown at arrows B.

Figure 6:
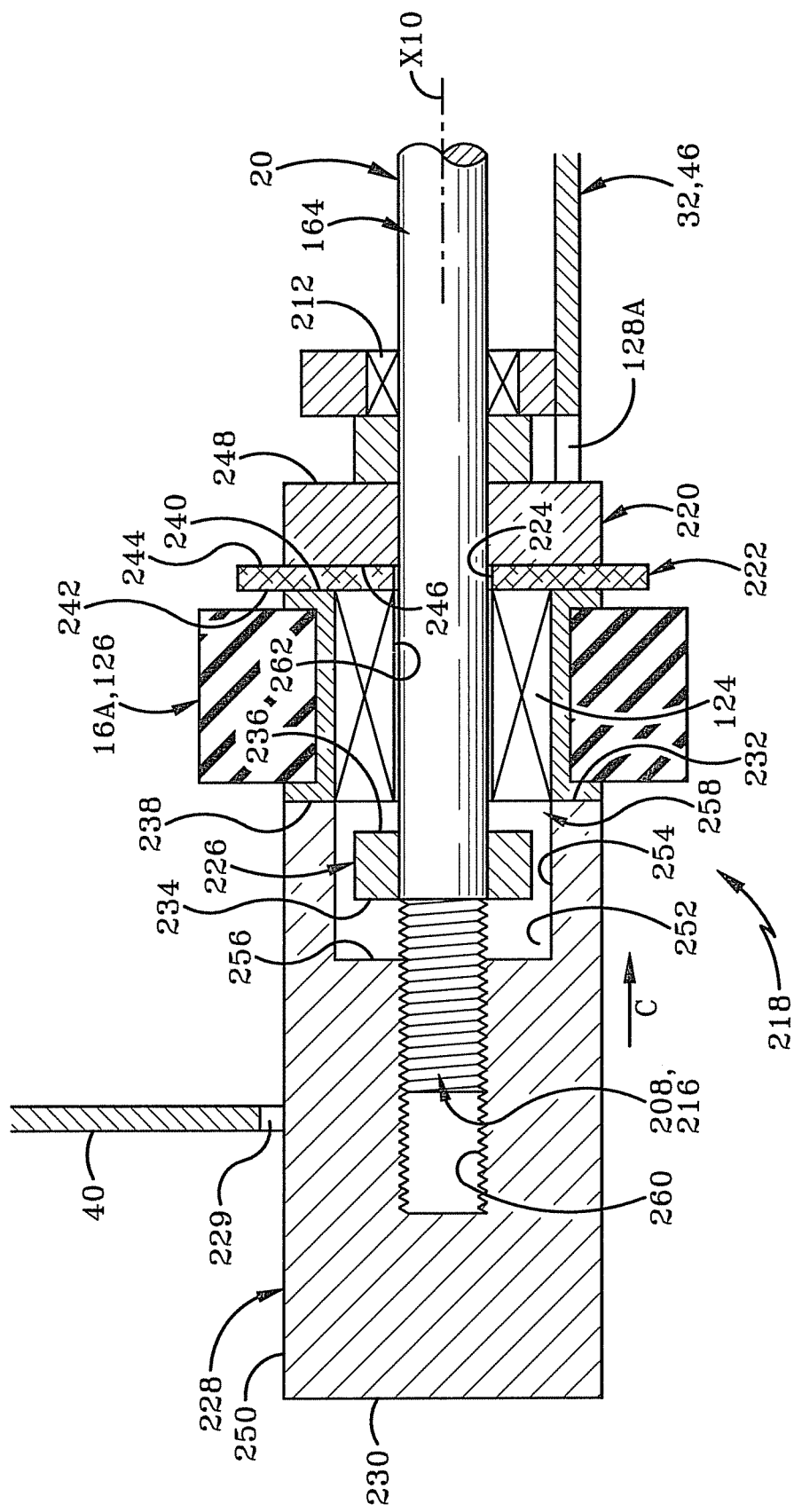
FIG. 6 is similar to FIG. 5 and shows the clutch in the engaged position.

When handle 228 is unthreaded or loosened to the degree that side or edge 232 of handle 228 moves outwardly or to the right beyond side 236 of retaining member 226, the sliding movement of wheel 16A and disc 222 is limited in the outward or rightward direction by the engagement between side 232 of bearing 124 and side 236 of collar 226, which serves as a stop. The sliding movement of wheel 16A and disc 222 in the inward or leftward direction is limited by engagement of side 244 of disc 222 and side 246 of hub 220, which also serves as a stop. When handle 228 is in its loosened or disengaged position (FIG. 5), there is thus typically a narrow space defined between side 232 of bearing 124 and side 236 of collar 226, a narrow space defined between side 240 of wheel 16A and side 242 of disc 222 and a narrow space defined between side 244 of disc 222 and side 246 of hub 220. Handle 228 may be rotated in the tightening direction to the engaged position (FIG. 6) of the clutch in which engagement end 232 of handle 228 engages side 238 of wheel 16A, side 240 of wheel 16A engages side 242 of disc 222, and side 244 of disc 222 engages side 246 of hub 220 with handle 228 applying an inward force (arrow C) parallel to axis X10 to wheel 16A, which is translated to disc 222 and hub 220 with wheel 16A and disc 222 sandwiched tightly between end 232 of handle 228 and side 246 of hub 220. Handle 228 and hub 220 thus serve as clamping members which selectively clamp therebetween wheel 16A and disc 222.

Hub 220, disc 222, bearing 124, wheel 16A, retaining member 226 and handle 228 all are annular substantially cylindrical members which have substantially circular outer perimeters concentric about axis X10 and which are mounted on shaft 164 and extend radially outwardly therefrom. Of these several members, hub 220 and retaining member 226 are rigidly secured to shaft 164 such that they are fixed relative to shaft 164. Thus, components 220 and 226 cannot move relative to shaft 164 in any direction, including parallel to the shaft or rotationally relative to the shaft whether the clutch is in the engaged or disengaged position. In contrast, disc 222, bearing 124 and wheel 16A are slidably movable parallel to the shaft and rotatably about the shaft when the clutch is in the disengaged position (FIG. 5). In the engaged position (FIG. 6) of the clutch, wheel 16A and disc 222 are fixed relative to shaft 164 and thus rotate with shaft 164. Whereas disc 222, wheel 16A and bearing 124 are freely slidable back and forth in the disengaged position, handle 228 moves back and forth parallel to axis X10 only as a result of rotational movement being translated into axial movement via the threaded engagement between handle 228 and threaded portion 216. In the engaged position of the clutch, handle 228 is thus fixed relative to shaft 164 and the various other components of the clutch and thus rotates with shaft 164.

When handle 228 is loosened so that the clutch is in the disengaged position (FIG. 5), disc 222, bearing 124 and wheel 16A are no longer fixedly secured to shaft 164 although during normal operation of machine 1 even in the stationary mode, shaft 164 will rotate about axis X10 and thus may impart some rotational force or torque to disc 222 and bearing 124, which may in itself impart a small degree of torque to drive wheel 16A. Thus, disc 222, bearing 124 and wheel 16A may rotate with shaft 164 even in the disengaged position of the clutch absent a force distinct from and opposite the rotation of shaft 164 which prevents such rotation with shaft 164. However, the degree of torque which may be translated from shaft 164 to wheel 16A in the disengaged position is minimal and is not enough to cause the rotation of wheel 16A or the travel of machine 1 when wheels 16 are seated on support surface 28 with the full weight of machine 1 thereon. In such a case, the rotation of shaft 164 may cause rotation of the inner portion of bearing 124, but will not cause rotation of wheel 16A. In the stationary or non-traveling mode of machine 1, handle 228 may be completely unthreaded from threaded portion 216 such that handle 228 is separated from shaft 164 and removed through opening 229 in the housing whereby handle 228 is separated from the remainder of machine 1. When handle 228 is separated, shaft 164 is typically entirely within interior chamber 144 although threaded end 216 is visible through holes 128A and 229.

The operation of machine 1 is now described in greater detail. As discussed above, machine 1 has a travel mode and a stationary or non-travel mode. In the non-travel mode, handle 228 is loosened and may be removed from shaft 164 so that clutch 218 is in the disengaged position (FIG. 5). In the stationary or non-traveling mode, machine 1 is seated on and typically entirely supported by support surface 28 either by wheels 16 alone such that wheels 16 contact surface 28 and feet 22 are out of contact with surface 28, on a combination of feet 22 and wheels 16 such that feet 22 and wheels 16 contact surface 28, or on feet 22 alone such that feet 22 contact surface 28 and wheels 16 do not contact surface 28. In the first instance, feet 22 are in the raised position (FIG. 8) such that distance D3 is less than distance D2; in the second instance, one or more of feet 22 are in an intermediate position such that the bottom of one or more of feet 22 are the same height as the bottoms of wheels 16 such that distance D3 equals distance D2 for at least one of the feet; and in the last instance, the feet 22 are in the lowered position (FIG. 2) such that distance D3 is greater than distance D2 with the bottoms of the feet lower than the bottoms of the wheels 16. If feet 22 are lowered sufficiently that drive wheel 16A does not contact surface 28, clutch 218 may remain in the engaged position without causing the travel of machine 1 via rotation of drive wheel 16A.

During initial setup, the machine is plugged in (wires not shown) to provide electric power to motor 154 and other electrically powered components of the machine. Machine 1 also typically has pneumatic hoses (not shown) connected to a source of compressed air (not shown) primarily to provide pneumatic operation of the pivotal movement of welding unit 8 between its welding and non-welding positions and the vertical sliding movement of upper pinch roller 10 between its pinching and non-pinching positions. The user may adjust the temperature of welding tip 106 with temperature control 92, the rotational speed of the pinch rollers (and drive wheel 16 when used) with speed control 94, and the amount of pressure applied by pinch roller 10 on pinch roller 12 with roller pressure control 100. The pneumatic pressure may be determined visually via pressure gauge 98. Drive delay control 96 is used to set the degree of time delay desired for the pinch rollers to begin rotating after welding tip 106 has moved into the welding position.

In the non-traveling mode (FIG. 7), the user will position one or more sheets 264 of heat weldable flexible thermoplastic material to be welded by machine 1. More particularly, the user will position a sheet 264 along an edge 266 of sheet 264 (or more than one flexible sheet 264) within guide 14 and/or adjacent guide 14 and pinch rollers to prepare for the insertion of the sheet 264 or sheets along the edge or edges thereof between the pinch rollers. The figures show only one sheet 264 for simplicity, with one edge 266 of sheet 264 folded over within guide 14 upstream of the pinch rollers. The operator uses switch 86 to move the pinch rollers from the open to the closed position, more particularly causing the upper pinch roller assembly to move downwardly via a pneumatic actuator so that the outer surface of pinch roller 10 engages and is pressed against the outer surface of pinch roller 12. The user will then activate the on or go switch 82 so that the pneumatic drive mechanism 104 causes welding unit 8 to pivot whereby heated welding tip 106 moves from the non-welding position to the welding position, and so that motor 54 is turned on to cause rotation of its output drive and the rotation of output 158 of the drive mechanism via gear box 156, which causes the rotation of the pinch rollers 10 and 12 in opposite directions via drive train 20.

More particularly and with reference to FIG. 2, the rotation of drive shaft 158 causes rotation of sprocket 166, which is translated to revolving movement of chain 178, which is translated to rotational movement of sprocket 172 and drive shaft 160 and sprocket 174, which is translated to revolving movement of chain 180 and the rotational movement of sprocket 114 and upper pinch roller 10 about axis X2. Simultaneously, the rotation of shaft 158 causes rotation of sprocket 168, which is translated to revolving movement of chain 176, which is translated to the rotational movement of sprocket 170, shaft 164 and the various components of the clutch previously discussed whereby shaft 164, sprocket 170 and the clutch components (and drive wheel 16A when clutch 218 is in the engaged position) rotate in the same direction as pinch roller 10, sprockets 114, 166, 172 and 174 and drive shafts 158 and 160. The rotational movement of gear 184 is thus translated to reverse rotational movement of gear 182, shaft 162 and lower pinch roller 12 via the mesh between gears 182 and 184. Thus, pinch roller 12 rotates in the opposite direction from pinch roller 10 and all other components which rotate in the same direction as pinch roller 10, including drive wheel 16A when wheel 16A is being rotationally driven.

Referring again to FIG. 7, the user in the exemplary embodiment folds sheet 264 adjacent edge 266 to form a folded upper or overlying layer 268 of sheet 264 which overlies an unfolded lower layer 270 of sheet 264 and moves sheet 264 such that layers 268 and 270 pass through guide 14 and adjacent welding tip 106 so that layers 268 and 270 are sufficiently heated for plastic welding. Sheet 264 is then moved so that heated layers 268 and 270 pass between the counter-rotating pinch rollers, which pinch the heated layers 268 and 270 therebetween and pull the layers rearward to complete the formation of a plastic welded seam 272 typically from one end of sheet 264 to the opposed end thereof. In the stationary mode, the sheet material is thus moved generally horizontally rearward relative to the stationary machine 1, as shown by Arrow D in FIG. 7.

In the traveling mode (FIGS. 8-10), the above steps are likewise followed except that the clutch is put in the engaged position (FIG. 6) by rotating handle 228 in the tightening direction to the clutch engaged position so that drive wheel 16A may be rotationally driven via drive train 20 as previously discussed. In addition, feet 22 are moved to their raised position (FIG. 8) out of contact with surface 28 such that wheels 16 engage surface 28. Furthermore, machine 1 is positioned on surface 28 with guide 26 received within spaces 138 and pathway 140 (FIG. 9). When the operator activates the travel on or go switch 82, the rotation of drive wheel 16A thus causes forward horizontal movement (Arrow E in FIG. 10) of machine 1 parallel to guide 26 as guide rollers 24 respectively rollingly engage the sides of guide 26 and wheels 16 roll along the support surface 28. In the traveling mode, the sheet material remains substantially stationary and seated on support surface 28 with the general exception of the material being folded along the edge(s) 266 and/or raised into position between guide 14 and the pinch rollers while machine 1 travels relative to support surface 28 and the sheet 264 or sheets which is or are being welded to produce seam 272.

Thus, the operator will typically walk along the floor beside the tabletop or elevated support surface 28 in front of machine 1 to help feed (and fold where necessary) the sheet or sheets 264 of material into guide 14 as machine 1 travels along surface 28. As previously discussed, drive wheel 16A and pinch rollers 10 and 12 have substantially identical diameters D1 such that the same rate of rotation of drive shafts 160, 162 and 164, and thus the same rate of rotation of pinch rollers 10 and 12 and drive wheel 16A causes machine 1 to roll at a rate along support surface 28 which is the same as the feed rate of the sheet material in the opposite direction provided by the rotation of pinch rollers 10 and 12.

Thus, the present invention provides a relatively small and lightweight welding machine which may be used both in a stationary and traveling mode. In addition, the machine provides a convenient clutch which allows the operator to rapidly transition between the travel and stationary modes. Furthermore, the machine includes a drive mechanism including a single motor for driving the rotation of the pinch rollers and the drive wheel, which facilitates the ability of the machine to provide the travel mode while remaining small and lightweight.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A welding machine comprising:
a frame;
a plurality of support surface-engaging wheels extending downwardly from the frame adapted for rolling on a support surface; the wheels comprising a drive wheel;
a welding unit mounted on the frame;
a set of first and second pinch rollers rotatably mounted on the frame;
a motor operatively connected to the drive wheel and pinch rollers for driving rotation of the drive wheel and pinch rollers;
a traveling mode of the machine in which the motor drives rotation of the drive wheel to cause travel of the machine; and
a stationary mode of the machine in which the machine is stationary and the motor drives rotation of the pinch rollers.

2. The machine of claim 1 further comprising
a first drive shaft on which the drive wheel is mounted;
a second drive shaft on which the first pinch roller is mounted;
first and second opposed ends of the first drive shaft;
first and second opposed ends of the second drive shaft;
wherein the first ends are adjacent one another and the second ends are distal one another.

3. The machine of claim 1 further comprising
a drive train which couples the motor to the drive wheel and pinch rollers;
a drive wheel drive assembly of the drive train which extends from adjacent the motor to adjacent the drive wheel and comprises a first drive shaft;
a first pinch roller drive assembly of the drive train which extends from adjacent the motor to adjacent the first pinch roller and comprises a second drive shaft; and
a second pinch roller drive assembly of the drive train which extends from adjacent the motor to adjacent the second pinch roller and comprises a third drive shaft
a first gear secured to and rotatable with the first shaft;
a second gear secured to and rotatable with the third shaft;
wherein the first and second drive shafts rotate in a first direction when the third drive shaft is rotating in a second opposite direction; and
the first gear meshes with the second gear whereby the first gear and first shaft rotate in the first direction and the second gear and third shaft rotate in the second opposite direction.

4. The machine of claim 1 further comprising
a housing which houses the motor; and
a portion of the drive wheel within the housing.

5. The machine of claim 1 further comprising
a pair of guide rollers which are rotatably mounted on the frame and which are adapted to rollingly engage a track to guide movement of the machine along the support surface.

6. The machine of claim 1 further comprising
a drive train which extends from adjacent the motor to adjacent the drive wheel; and
a clutch of the drive train having an engaged position in which the motor is drivingly coupled to the drive wheel and a disengaged position in which the motor is not drivingly coupled to the drive wheel.

7. The machine of claim 6 further comprising
a hub secured to the drive shaft; and
a clutch control member which selectively clamps the drive wheel between the clutch control member and hub.

8. The machine of claim 6 wherein the clutch comprises a friction disc.

9. The machine of claim 1 wherein the drive wheel has a driving mode in which the drive wheel rotates in response to operation of the motor and a non-driving mode in which the drive wheel does not rotate in response to operation of the motor.

10. The machine of claim 9 further comprising
a drive shaft on which the drive wheel is mounted and which rotates in response to operation of the motor;
wherein the drive wheel rotates with the drive shaft in the driving mode and is rotatable relative to the drive shaft in the non-driving mode.

11. The machine of claim 1 further comprising
a drive shaft which rotates in response to operation of the motor; and
a bearing mounted on the drive shaft;
wherein the drive wheel is mounted on the drive shaft via the bearing so that the drive wheel is rotatable relative to the drive shaft.

12. The machine of claim 1 further comprising
a drive wheel drive assembly which extends from adjacent the motor to adjacent the drive wheel and comprises a drive shaft on which the drive wheel is mounted;
wherein the motor drives rotation of the drive shaft in the traveling mode and in the stationary mode.

13. The machine of claim 1 further comprising
a drive train which couples the motor to the drive wheel and pinch rollers;
a drive wheel drive assembly of the drive train which extends from adjacent the motor to adjacent the drive wheel and comprises a first drive shaft;
a first pinch roller drive assembly of the drive train which extends from adjacent the motor to adjacent the first pinch roller and comprises a second drive shaft; and a second pinch roller drive assembly of the drive train which extends from adjacent the motor to adjacent the second pinch roller and comprises a third drive shaft;

a gear reduction box which is driven by a rotational output of the motor and which includes a gear reduction box rotational output;

wherein the first and second pinch rollers have a pinching position in which the first and second pinch rollers are in contact with one another;

the drive wheel is mounted on the first drive shaft;

the second pinch roller is mounted on the third drive shaft the first pinch roller drive assembly comprises a pinch roller axle on which the first pinch roller is mounted;

the first pinch roller drive assembly comprises a first flexible closed drive loop extending downwardly from adjacent the second drive shaft to adjacent the gear reduction box rotational output;

the first pinch roller drive assembly comprises a second flexible closed drive loop extending downwardly from adjacent the second drive shaft to adjacent the pinch roller axle; and rotation of the first pinch roller is driven by rotation of the rotational output of the motor rotation of the sear reduction box rotational output, revolving movement of the first flexible closed drive loop, rotation of the second drive shaft, revolving movement of the second flexible closed drive loop, and rotation of the pinch roller axle.

14. The machine of claim 13 wherein the first flexible closed drive loop is one of (a) a chain which engages and revolves around a sprocket secured to the second drive shaft and a sprocket secured to the gear reduction box rotational output, and (b) a closed loop drive belt which engages and revolves around a sheave secured to the second drive shaft and a sheave secured to the gear reduction box rotational output; and the second flexible closed drive loop is one of (c) a chain which engages and revolves around a sprocket secured to the second drive shaft and a sprocket secured to the pinch roller axle, and (d) a closed loop drive belt which engages and revolves around a sheave secured to the second drive shaft and a sheave secured to the pinch roller axle.

15. A welding machine comprising:
a frame;
a plurality of support surface-engaging wheels extending downwardly from the frame adapted for rolling on a support surface; the wheels comprising a drive wheel;
a welding unit mounted on the frame;
a set of first and second pinch rollers rotatably mounted on the frame;
a motor operatively connected to the drive wheel and pinch rollers for driving rotation of the drive wheel and pinch rollers;
a drive train which couples the motor to the drive wheel and pinch rollers;
a drive wheel drive assembly of the drive train which extends from adjacent the motor to adjacent the drive wheel and comprises a first drive shaft;
a first pinch roller drive assembly of the drive train which extends from adjacent the motor to adjacent the first pinch roller and comprises a second drive shaft;
a second pinch roller drive assembly of the drive train which extends from adjacent the motor to adjacent the second pinch roller and comprises a third drive shaft; a housing having a main section, a top ami which extends outwardly from the main section to an upper free end and a bottom arm which extends outwardly from the main section to a lower free end;

wherein the first drive shaft extends within the main section;
the second drive shaft extends within the top arm;
the third drive shaft extends within the bottom arm;
the first pinch roller is adjacent the upper free end; and
the second pinch roller is adjacent the lower free end.

16. A welding machine comprising:
a frame;
a plurality of support surface-engaging wheels extending downwardly from the frame adapted for rolling on a support surface; the wheels comprising a drive wheel;
a welding unit mounted on the frame;
a set of first and second pinch rollers rotatably mounted on the frame;
a motor operatively connected to the drive wheel and pinch rollers for driving rotation of the drive wheel and pinch rollers; and
a foot mounted on the frame and movable between a raised position in which the drive wheel is engageable with the support surface and a lowered position in which the drive wheel is not engageable with the support surface.

17. A welding machine comprising:
a frame;
a plurality of support surface-engaging wheels extending downwardly from the frame adapted for rolling on a support surface; the wheels comprising a drive wheel;
a welding unit mounted on the frame;
a set of first and second pinch rollers rotatably mounted on the frame;
a motor operatively connected to the drive wheel and pinch rollers for driving rotation of the drive wheel and pinch rollers;
a drive train which couples the motor to the drive wheel;
a drive shaft on the drive train;
a threaded portion of the drive shaft; and
a handle which is adjacent the drive wheel and threadedly engages the threaded portion.

18. The machine of claim 17 further comprising
first and second opposed ends of the handle;
a recess formed in the handle which extends inwardly from the first end toward the second end to an intermediate surface; and
a threaded hole formed in the handle which extends from the intermediate surface toward the second end and threadedly engages the threaded portion of the shaft.

19. A combination of a support surface and a welding machine comprising:
a frame;
a welding unit mounted on the frame;
a set of first and second pinch rollers rotatably mounted on the frame;
a motor mounted on the frame; and
a plurality of support surface-engaging wheels extending downwardly from the frame for rolling the frame on the support surface; the wheels comprising a drive wheel having a driving mode in which the drive wheel rotates in response to operation of the motor so that the plurality of wheels roll along the support surface and a non-driving mode in which the drive wheel does not rotate in response to operation of the motor so that the plurality of wheels do not roll along the support surface.

20. The combination of claim 19 further comprising
a drive train which couples the motor to the drive wheel;
a drive shaft on the drive train;

a threaded portion of the drive shaft; and
a handle which is adjacent the drive wheel and threadedly engages the threaded portion.

* * * * *

UNITED STATES PATENT AND TRADEMARK OFFICE
CERTIFICATE OF CORRECTION

| | |
|---|---|
| PATENT NO. | : 9,061,467 B2 |
| APPLICATION NO. | : 13/278314 |
| DATED | : June 23, 2015 |
| INVENTOR(S) | : Brian D. Henry |

It is certified that error appears in the above-identified patent and that said Letters Patent is hereby corrected as shown below:

In the claims,

Column 15, line 24 (Claim 13) change "the sear reduction" to --the gear reduction--

Column 15, line 67 (Claim 15) change "top ami which" to --top arm which--

Signed and Sealed this
Twentieth Day of October, 2015

Michelle K. Lee
*Director of the United States Patent and Trademark Office*